J. V. SCHMID.
PIPE CLAMP.
APPLICATION FILED APR. 21, 1908.

908,335.

Patented Dec. 29, 1908.

2 SHEETS—SHEET 1.

Witnesses
P. F. Nagle
H. G. Dieterich

Inventor
John V. Schmid
By Wiedersheim & Fairbanks
Attorneys

J. V. SCHMID.
PIPE CLAMP.
APPLICATION FILED APR. 21, 1908.

908,335.

Patented Dec. 29, 1908.

2 SHEETS—SHEET 2.

Witnesses
P. F. Nagle.
Harry C. Dalton.

Inventor
John V. Schmid.
By Wiedersheim & Fairbanks
Attorneys

THE NORRIS PETERS CO., WASHINGTON, D. C.

UNITED STATES PATENT OFFICE.

JOHN V. SCHMID, OF PHILADELPHIA, PENNSYLVANIA, ASSIGNOR TO THE SIMPLEX ENGINEERING CO., OF PHILADELPHIA, PENNSYLVANIA, A CORPORATION OF PENNSYLVANIA.

PIPE-CLAMP.

No. 908,335.      Specification of Letters Patent.      Patented Dec. 29, 1908.

Application filed April 21, 1908. Serial No. 428,369.

*To all whom it may concern:*

Be it known that I, JOHN V. SCHMID, a citizen of the United States, residing in the city and county of Philadelphia, State of Pennsylvania, have invented a new and useful Pipe-Clamp, of which the following is a specification.

This invention relates to a device adapted for use in connection with pipe fitting and has for an object to provide a pipe clamp of simple and strong design that may be readily applied to a pipe in close proximity to a joint, whereby leaking at this junction is prevented.

It is well known that in pipe fittings, especially those conveying steam or hot water, that leaks frequently develop at the joints, often necessitating the disconnection of the entire line to make a repair.

It is an object of my invention to repair such a leak without any detachment of the several parts of the pipe line.

A further object is to provide a packing as a part of my novel clamp which is pressed over the pipe joint by a suitable means, the direction of the applied force being substantially in a line drawn through the packing and the joint, thereby firmly and accurately maintaining the packing directly over the joints.

A still further object is to provide a pipe clamp in which the use of set screws or similar attaching devices are dispensed with, as means of this character have a tendency to spring the pipe relative to the fitting or pull the same away from the joint.

It further consists of other novel features of construction, all as will be hereinafter fully set forth.

For the purpose of illustrating my invention, I have shown in the accompanying drawings one form thereof, since this embodiment best illustrates the principles thereof and has been found in practice to give satisfactory and reliable results, although it is to be understood that the various instrumentalities of which my invention consists can be variously arranged and organized and that my invention is not limited to the precise arrangement and organization of these instrumentalities as herein set forth.

Figure 1:
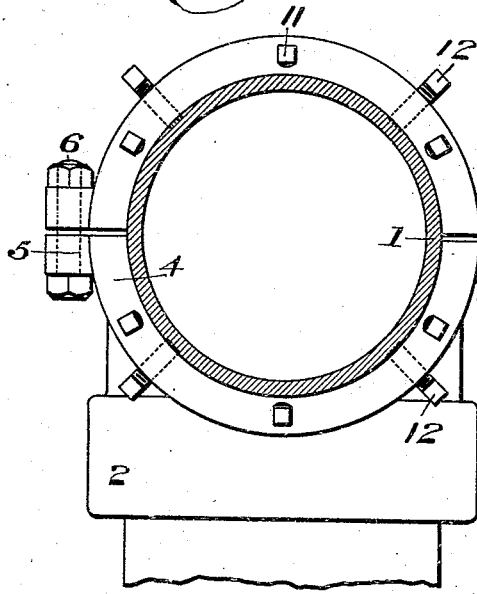
Figure 2:
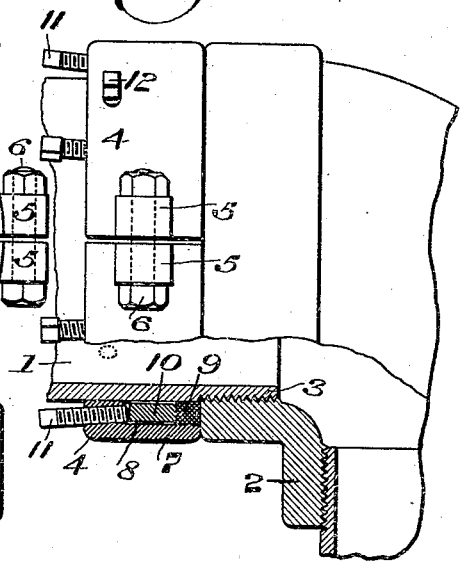
Figure 3:
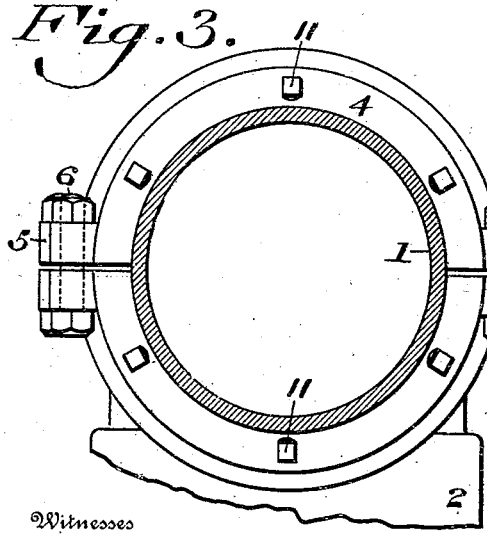
Figure 4:
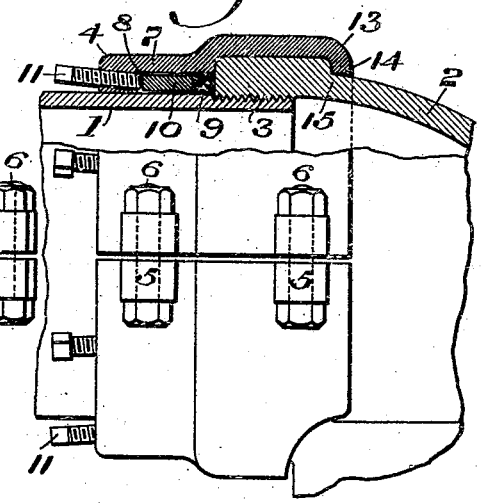
Figure 5:
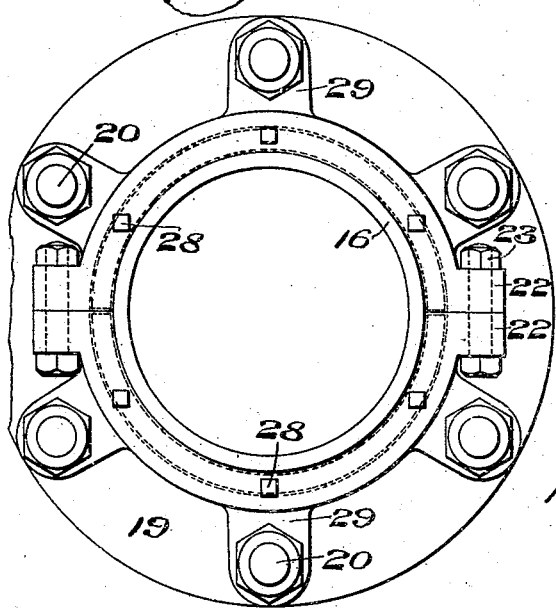
Figure 6:
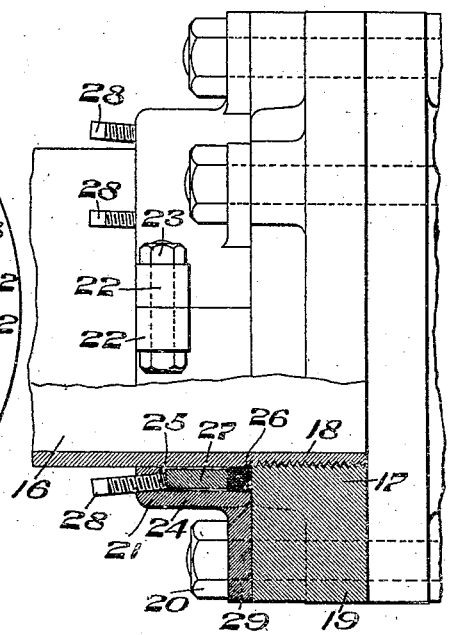
Figure 7:
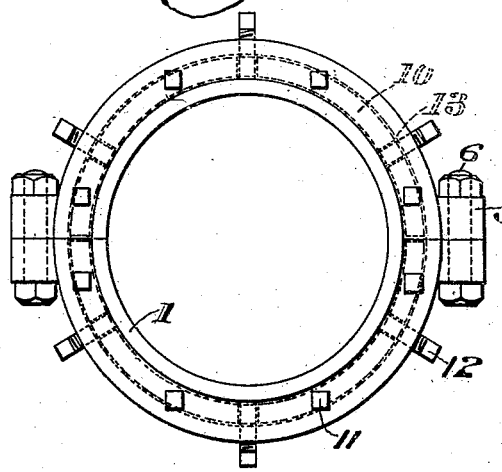
Figure 8:
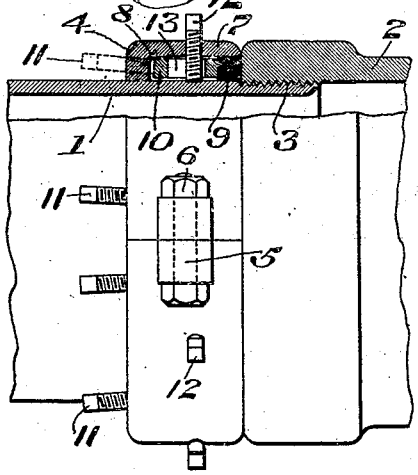

Figure 1 represents an end view of a clamp embodying my invention fitted in position upon a pipe. Fig. 2 represents a side elevation of the same with portions broken away showing a section. Fig. 3 represents an end view of a modification. Fig. 4 represents a side view of the same partly in section. Fig. 5 represents an end view of a modification somewhat similar to Fig. 4. Fig. 6 represents a side view thereof, partly in section. Fig. 7 represents an end view of another modification. Fig. 8 represents a side view of the same partly in section.

Similar numerals of reference indicate corresponding parts in the figures.

Referring to the drawings:—1 designates an ordinary steam or water pipe connected to an elbow 2 or other suitable fitting by the usual screw threads forming joints 3. Such joints frequently give trouble by leaking and especially is this true where the pipe contains steam or water under pressure. In order to obviate and prevent leaking at this point I provide a ring clamp 4, preferably formed in half sections adapted to be joined together by any suitable means, which in the present instance consist of apertured lugs 5 formed integral with each section and through which the clamping bolts 6 are passed. This ring 4 is provided with a flange 7 forming an extension, whereby an annular space 8 is provided between it and the pipe 1. This space serves the purpose of a stuffing box structure and carries therein suitable packing 9 adapted to be placed in close proximity to the screw thread joints 3. In order to firmly press the packing 9 into place over the joint, an annulus 10 is placed in the space back of the packing to coöperate therewith and is firmly held in position by any suitable adjusting means, as the set screws 11. It will of course be understood that the annulus 10 is split at suitable points in order to allow the same to be properly adjusted over the pipe in the space formed by the flange 7, the joints closely abutting in order to present substantially a solid face against the packing 9. These set screws 11 as here shown pass through threaded openings in the ring 4 and are placed at intervals around the face thereof and are preferably drilled and tapped at a slight angle in order that the heads of the set screws 11 may easily be engaged by a wrench or screw-driver without interference from the side of the pipe 1. Set screws 12 are provided at suitable points around the periphery of the ring 4 and serve to clamp the same against lateral movement upon the pipe thereby holding the extension 7 snugly against the pipe fitting 2.

It will be readily seen that as the set screws 11 are threaded inwardly they engage the annulus 10 and force the same against the packing 9 which is compressed over the joint 3. Attention is especially directed to this feature of compressing the packing and the manner in which the set screws 11 perform this function, since the force applied acts directly along the line corresponding to the axis of the set screw 11 and passing through the annulus 10, the packing 9 and the pipe joint. Heretofore in devices of like character the means for compressing the packing over the joints have operated at a considerable angle from the line of the joints and thereby exert a leverage on the coöperating parts, which are usually some form of lug, and the constant pressure exerted snaps off these lugs or similar coöperating parts.

In the embodiment disclosed in Figs. 3 and 4, 1 designates a steam or water pipe joined to a suitable fitting 2, having a screw threaded connection therebetween forming the joint 3. Exteriorly of the pipe 1 and adapted to fit thereover is a ring clamp 4 preferably formed in sections and joined together in any suitable manner, in the present instance lugs 5 being formed integral with the rings 4 and are adapted to receive fastening bolts 6. Integral with the ring clamp 4 is a prolongation or flange 7 whereby an annular space 8 is formed between it and the pipe 1 for the purpose of forming a space in which suitable packing material 9 is placed and compressed by suitable means, whereby a stuffing box structure is provided. In the present instance the packing 9 is engaged by an annulus 10 within the space formed by the prolongation 7 and of course back of the packing 9, in which position it is adapted to be engaged by adjusting screws 11 passing through suitable apertures in the ring clamp 4 and which actuate to advance the ring 10 to press the packing 9 tightly over the joint. It will be noted that the adjusting screws 11 act substantially in a direct line through the ring clamp, packing and joint 3 whereby the applied force is directed to force the packing into the joint without strain upon adjacent parts of the ring clamp. It will of course be understood that the set screws 11 are screwed into the ring 4 at a slight angle in order that they may the more easily be engaged by a wrench or screw-driver to be adjusted without interfering with the side of the pipe 1. In the present instance the flange 7 is somewhat prolonged, forming an extension coupling member 13 having an inturned lip 14 and is so shaped that the internal contour thereof conforms to the flanges 15 of the connected fitting. It will be clear that in this type of clamp as the parts of the same are fitted over the flange 15 and securely bolted together by means of the fastening bolts 6, that the clamp itself practically becomes an integral part of the fitting which carries the flange 15, from which construction it is apparent that the operation of the set screws 11 forcing the annulus 10 against the packing 9, tends to compress the latter over the joint 3 and there is never any tendency to force the pipe 1 away from its connected fitting 2.

In the modification shown in Figs. 5 and 6, 16 designates an ordinary steam or water pipe connected to a fitting 17 by the usual screw threads forming joints 18, leaking of which it is the function of my novel clamp to prevent. It will be noted that the fitting 17 has formed integral a flange 19 having apertures through which the securing bolts 20 are adapted to pass and secure the said fitting 17 to the next adjacent similar member. 21 designates a ring clamp preferably formed in sections adapted to be joined together by any suitable means, which in the present instance consists of apertured lugs 22 formed integral with each section and through which clamping bolts 23 are passed. This ring 21 is provided with a flange 24, one portion of which forms an annular space 25 between it and the pipe 17, serving the purpose of a stuffing box structure in which suitable packing 26 is placed and is engaged by an annulus 27 actuated by any suitable means. As here shown, the packing 26 is located directly over the joints 18 and in the space back of the same is placed the annulus 27 against which the set screws 28 engage to adjust the packing properly over the joints. It will be note that the applied force of the set screws acts substantially in a direct line through the ring, packing and thread, whereby any strains on any other portions of the clamp are prevented and an efficient compression of the packing be made possible by a turn or two of the screws 28. These screws are of course threaded at a slight angle into the ring clamp in order that a wrench or screw-driver may properly engage them without interfering with the pipe 16. 29 designates apertured lugs formed integral with the flange 24 and so spaced about the surface of the ring clamp as to aline with the apertures in the flange 19 through which the bolts 20 are adapted to pass. It will be seen that this type of clamp may be readily attached to any flange fitting and when secured in place the packing 26 may be compressed to a very high degree over the joint 18 by the operation of the screws 28 and there will still be absolutely no danger of pulling one portion of the joint away from the other.

In the modification shown in Figs. 7 and 8, I provide the annulus 10 with slotted apertures 13 at suitable points, making provision for the set screws 12, which secure the clamp to the pipe 1, by which construction I am enabled to place the set screws much nearer the joints of the pipe and thereby reduce the shearing strain on these members as the packing 9 is compressed by the action of the adjusting screw. When a leak develops at a joint, instead of taking down a long length of pipe in which there may be many joints between the leak and a union, the parts of my clamp are slipped over the pipe so that the packing is directly over the joint, then the bolts 6 are tightened to maintain the clamp in its correct position. The set screws 11 are now adjusted to force the ring 10 against the packing 9 and press the latter over the joint to prevent further leaking at this point.

I am aware that pipe clamps have been heretofore devised comprising numerous parts and complicated structures but I am the first to embody in a single complete unitary structure a clamp wherein the adjusting means operates directly upon the packing parts and in a line passing through the joint. Furthermore, a clamp structure is provided that may be readily attached to any type of pipe joint and as soon as it is fixedly secured in place thereon, becomes substantially an integral part of the joint as far as lateral movement relative thereto is concerned, and furthermore a complete and efficient adjustment of the packing may be made without danger of pulling one portion of the joint from the other.

I am aware that it has heretofore been proposed in the patent to Phillips, No. 688,683, dated Dec. 10, 1901, to employ a sectional containing ring adapted to receive suitable packing in conjunction with a gland ring also made in sections adapted to bear against said packing, together with a separate stationary adjusting ring having adjusting screws passing therethrough and bearing upon said gland ring, and that numerous devices of this general character exist in the prior art. It is, however, the desideratum in the commercial manufacture of devices of this character that unnecessary parts be reduced to a minimum and that these devices be constructed in such a manner that they can be quickly applied by unskilled labor and without necessitating undue manipulation of a multiplicity of parts.

My present invention is clearly differentiated from the Phillips device aforesaid, as will be apparent to those skilled in the art, since the same dispenses with the stationary ring, and in actual practice it has been demonstrated that my novel device can be applied with much greater rapidity and facility than said device of the prior art. I am also aware that it has been heretofore proposed to employ the combination of a containing ring having packing therein and a gland or its equivalent, provided with lugs or a flange, upon which latter the adjusting or tightening screws bear, the pressure of said screws being, to a certain extent, out of direct alinement with the packing and in the packing ring, whereby a leverage is created in practice, which causes said lugs or flange to break, in case the adjusting screws are set up too tightly, examples of this feature being found in the patent to Reed No. 706,780 of Aug. 12, 1902 and patent to Frick No. 676,944 of June 25, 1901.

All the disadvantages of the prior art are obviated in my present invention, since the various elements, as the adjusting screws 11 or 28, as the case may be, are in every instance so situated that the line of compression exerted by them is so directed as to attain the most useful and effective result, since the ring 10 or 27, as the case may be, is enabled to bear directly upon the packing in such a manner that the same is in every instance compressed to the best advantage.

So far as I am aware I am the first in the art to produce a concrete, unitary structure possessing the above advantages and to none of the constructions of the prior art do I herein make my claims.

Having thus described my invention, what I claim as new and desire to secure by Letters Patent, is:—

1. In a device of the character described, a ring clamp adapted to fit over a pipe, a flange integral therewith forming, with the pipe, an annular space, an annulus in said space, packing filling a portion of said space between the flange and pipe, said flange abutting the packing around its entire outer surface, whereby radial expansion of the packing is prevented, adjusting means substantially in alinement with said annulus and packing to move said annulus, longitudinally of the pipe and parallel to the axis thereof, to compress said packing over a pipe joint and means coöperating with said pipe to lock said ring clamp against longitudinal movement.

2. In a device of the character described, a ring clamp adapted to fit over a pipe, a flange integral therewith forming, with the pipe, an annular space, an annulus in said space, packing filling a portion of said space between the flange and pipe, said flange abutting the packing around its entire outer surface, whereby radial expansion of the packing is prevented, a plurality of set screws passing through said ring clamp substantially in alinement with said annulus and packing, to move said annulus longitudinally of the pipe and parallel to the axis thereof to compress said packing over a pipe joint and a plurality of radially disposed devices passing through said ring clamp to engage said pipe.

3. In a device of the character described, a ring clamp adapted to fit over a pipe, a flange integral therewith forming, with the pipe, an annular space, an annulus in said space, packing filling a portion of said space between the flange and pipe, said flange abutting the packing around its entire outer surface, whereby radial expansion of the packing is prevented, a plurality of set screws passing through said ring clamp substantially in alinement with said annulus and packing, to move said annulus longitudinally of the pipe and parallel to the axis thereof to compress said packing over a pipe joint, and means coöperating with said pipe to lock said ring clamp against longitudinal movement.

4. In a device of the character described, a ring formed in sections and adapted to be clamped over a pipe, a flange integral therewith forming, with the pipe, an annular space and having an extension provided with an inturned lip, an annulus in said space, packing filling a portion of said space between the flange and pipe, said flange abutting the packing around its entire outer surface, whereby radial expansion of the packing is prevented, and a plurality of set screws operating substantially in alinement with said ring and packing, to move said ring longitudinally of said pipe and parallel to the axis thereof to compress said packing over a pipe joint.

JOHN V. SCHMID.

Witnesses:
ROBERT M. BARR,
C. D. McVAY.